United States Patent
Zhu (10) Patent No.: US 10,235,621 B2
(45) Date of Patent: Mar. 19, 2019

(54) ARCHITECTURE FOR IMPLEMENTING AN IMPROVED NEURAL NETWORK

(71) Applicant: IOTELLIGENT TECHNOLOGY LTD INC, Orange, CA (US)

(72) Inventor: Theodore Zhu, Mission Viejo, CA (US)

(73) Assignee: IOTELLIGENT TECHNOLOGY LTD INC, Orange, CA (US)

( * ) Notice: Subject to any disclaimer, the term of this patent is extended or adjusted under 35 U.S.C. 154(b) by 432 days.

(21) Appl. No.: 14/271,137

(22) Filed: May 6, 2014

(65) Prior Publication Data
US 2014/0337263 A1    Nov. 13, 2014

Related U.S. Application Data

(60) Provisional application No. 61/820,379, filed on May 7, 2013.

(51) Int. Cl.
| | |
|---|---|
| G06N 3/04 | (2006.01) |
| H04W 84/18 | (2009.01) |
| H04W 4/38 | (2018.01) |
| H04W 4/80 | (2018.01) |
| H04L 29/08 | (2006.01) |

(52) U.S. Cl.
CPC ........... G06N 3/0445 (2013.01); H04W 4/38 (2018.02); H04W 4/80 (2018.02); H04W 84/18 (2013.01); H04L 67/12 (2013.01)

(58) Field of Classification Search
None
See application file for complete search history.

(56) References Cited

U.S. PATENT DOCUMENTS

| | | | | |
|---|---|---|---|---|
| 7,463,890 B2 * | 12/2008 | Herz | ..................... | H04W 84/18 370/229 |
| 8,140,658 B1 * | 3/2012 | Gelvin | .................. | G06F 15/173 709/224 |
| 8,364,148 B2 * | 1/2013 | Dravida | ................ | H04W 84/18 455/41.2 |
| 8,874,477 B2 * | 10/2014 | Hoffberg | ............. | H04W 72/082 718/104 |
| 9,186,793 B1 * | 11/2015 | Meier | ....................... | B25J 9/163 |

(Continued)

FOREIGN PATENT DOCUMENTS

| | | | |
|---|---|---|---|
| CN | 102255965 A | * | 11/2011 |
| CN | 202257228 U | * | 5/2012 |

OTHER PUBLICATIONS

Lian, K-Y et al. (Onlne Jan. 2013). "Intelligent multi-sensor control system based on innovative technology integration via ZigBee and Wi-Fi Networks". J of Network and COmputer Applications 36. pp. 756-767.*

(Continued)

*Primary Examiner* — Christian Chace
*Assistant Examiner* — Benjamin J Buss
(74) *Attorney, Agent, or Firm* — Vista IP Law Group, LLP (57) ABSTRACT

Disclosed is an improved approach to implement artificial neural networks. According to some approaches, an advanced neural network is implemented using an internet-of-things methodology, in which a large number of ordinary items having RFID technology are utilized as the vast infrastructure of a neural network.

38 Claims, 9 Drawing Sheets

(56) References Cited

U.S. PATENT DOCUMENTS

| | | | | |
|---|---|---|---|---|
| 2003/0183697 | A1* | 10/2003 | Porter | G06K 7/0008 235/492 |
| 2011/0213869 | A1* | 9/2011 | Korsunsky | H04L 63/20 709/223 |
| 2012/0163127 | A1* | 6/2012 | Gerdes | G08B 13/1672 367/135 |
| 2012/0169469 | A1* | 7/2012 | Butler | G06K 7/0008 340/10.1 |
| 2013/0054863 | A1* | 2/2013 | Imes | H04L 12/2827 709/223 |
| 2013/0073496 | A1* | 3/2013 | Szatmary | G06N 3/10 706/25 |
| 2013/0088336 | A1* | 4/2013 | Doering | G06K 19/0723 340/10.51 |
| 2013/0093592 | A1* | 4/2013 | Lan | A01G 25/167 340/602 |

OTHER PUBLICATIONS

Karimi, K. et al. (Jun. 2013). "What the Internet of Things (IoT) Needs to Become a Reality". White Paper. ACM. 16 pages.*

Ning, H. (2011). "Future Internet of Things Architecture: Like Mankind Neural System or Social Organization Framework?" IEEE Communications Letters, vol. 15, No. 4. Apr. 2011. 3 pages.*

Rehman, A-u. (Apr. 2013). "Communication Technology That Suits IoT—A Critical Review." Wireless Sensor Networks for Developing Countries: First International Conference, WSN4DC 2013, Jamshoro, Pakistan, Apr. 24-26, 2013, Revised Selected Papers. vol. 366. Springer, 2013.*

De Guglielmo, D. et al. (2014) "From IEEE 802.15.4 to IEEE 802.15.4e: A Step Towards the Internet of Things". In: Gaglio S., Lo Re G. (eds) Advances onto the Internet of Things. Advances in Intelligent Systems and Computing, vol. 260. Springer, Cham. pp. 135-152. DOI: 10.1007/978-3-319-03992-3_10.*

Ishaq, I. et al. (Apr. 25, 2013). "IETF Standardization in the Field of the Internet of Things (IoT): A Survey". J. Sens. Actuator Netw. 2013, 2, 235-287; doi:10.3390/jsan2020235.*

Koubaa, A. et al. (Nov. 2006). "Collision-free beacon scheduling mechanisms for IEEE 802.15.4/Zigbee cluster-tree wireless sensor networks". Polytechnic Institute of Porto, Technical Report TR-061104.*

Tan, S.K. et al. (2011). "M2M Communications in the Smart Grid: Applications, Standards, Enabling Technologies, and Research Challenges". International Journal of Digital Multimedia Broadcasting, vol. 2011 (2011), Article ID 289015, 8 pages. DOI: 10.1155/2011/289015.*

Chung, T-Y et al. (Dec. 2013). "Social Web of Things: A Survey". 2013 International Conference on Parallel and Distributed Systems (ICPADS). pp. 575-575. DOI: 10.1109/ICPADS.2013.102.*

Athreya, A.P. et al. (Oct. 2013). "Designing for Self-Configuration and Self-Adaptation in the Internet of Things". 2013 9th International Conference Conference on Collaborative Computing: Networking, Applications and Worksharing (Collaboratecom). pp. 585-592. DOI: 10.4108/icst.collaboratecom.2013.254091.*

De Saint-Exupery, A. (Sep. 2009). "Internet of things, strategic research roadmap." Surrey: Internet of Things Initiative. 50 pages.*

International Search Report and Written Opinion dated Sep. 19, 2014 for related PCT Patent Application No. PCT/US14/36997, 13 pages.

* cited by examiner

ARCHITECTURE FOR IMPLEMENTING AN IMPROVED NEURAL NETWORK

CROSS REFERENCE TO RELATED APPLICATION(S)

The present application claims the benefit of priority to U.S. Provisional Patent Application Ser. No. 61/820,379, entitled "Architecture for Implementing an Improved Neural Network", filed May 7, 2013, which is hereby incorporated by reference in its entirety.

BACKGROUND

The term neural network often refers to artificial neural networks, which are composed of networked neurons or nodes. The term may refer to either biological neural networks or artificial neural networks for solving artificial intelligence problems.

A neural network is an information processing paradigm inspired by the way biological neural systems process data. The intent of many neural network networks is to be able to replicate the functional abilities of a biological neural network, which is typically composed of a group or groups of chemically connected or functionally associated neurons. A single neuron may be connected to many other neurons and the total number of neurons and connections in a network may be extensive.

It would be of great benefit to be able to implement an artificial neural network. The artificial neural networks may be used for many purposes. For example, neural networks can be used to perform predictive modeling, adaptive control, and many other types of analytical applications.

There have been many attempts in the past to use computing technologies to implement neural networks. However, past approaches to use computers failed to achieve desired performance levels because computers are just not sophisticated or complex enough to effectively replicate biological neural networks.

Therefore, there is a need for an improved approach to implement artificial neural networks that provides usable performance capabilities, and which can effectively replicate the sophistication and complexity of biological neural networks.

SUMMARY

The invention pertains to an improved approach to implement artificial neural networks. According to some embodiments of the invention, an advanced neural network is implemented using an internet-of-things methodology, in which a large number of ordinary items are utilized as the vast infrastructure of a neural network. The ordinary items are equipped within RFID tags to allow them to participate as part of the neural network. Artificial iotons are constructed using a DPU (distributed process unit) that becomes associated with RFID tags. These artificial iotons forms connections with other iotons, where over time, a huge network of connections are formed.

Other and additional objects, features, and advantages of the invention are described in the detailed description, figures, and claims.

BRIEF DESCRIPTION OF FIGURES

The present invention is illustrated by way of example, and not by way of limitation, in the figures of the accompanying drawings and in which like reference numerals refer to similar elements and in which.

DETAILED DESCRIPTION

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of mobile applications that receive additional role and environment information. It is noted, however, that the invention is not limited in its scope to these types of applications and this set of additional information, and indeed, may be applied to other types of applications and information as well.

The invention pertains to an improved approach to implement artificial neural networks. As a baseline set of objectives, there are numerous elements that can or should exist within an artificial neural network so that the neural network can provide usable performance capabilities, and which effectively allows the artificial neural network to replicate the sophistication and complexity of biological neural networks.

First, the neural network should be able to provide memory elements having the ability to store data. Intelligent behavior for the neural network is premised upon the ability to perform certain actions, such as analytical or reactive actions, which often depend upon access to memory.

Second, the neural network should be able to provide and/or have access to sensory inputs. Such sensory inputs may analogize to the types of sensory inputs available to the biological brain. For example, such sensory inputs may relate to vision inputs, sound inputs, touch inputs, motion inputs, etc.

Third, the neural network should provide an approach that allows a network to form between neural elements (artificial neurons). The network should be adaptive enough so that the neural elements can connect as needed and in adaptive patterns to implement "learning" processes.

Fourth, the neural network must be large enough to provide for a very large number of neurons. A biological neural network (such as a human brain) has many billions of biological neurons forming trillions of connections. To even come close to replicating this type of biological neural network, the artificial neural network should also similarly have an extremely large number of artificial neurons with the capability for trillions of connections. In the preferred embodiment, the processing power of the artificial neural network should even exceed the number of neurons that exist in a biological network.

According to some embodiments of the invention, an advanced neural network is implemented using an internet-of-things methodology, in which a large number of ordinary items are utilized as the vast infrastructure of a neural network. The ordinary items are equipped within RFID tags to allow them to participate as part of the neural network. These RFID tags include memory components, which allow the RFID tags to implement the first requirement stated above of the memory elements.

According to embodiments of the invention, multiple ones of the RFID tags are accessed and organized by an RFID reader/writer device to form artificial "iotons", which are physical embodiments of a neuron. The iotons are associated with sensors (such as MEMS sensors) to allow for sensory inputs. These sensors therefore satisfy the second requirement stated above for the sensory inputs.

In the current embodiment, the iotons form peer-to-peer network connections with other iotons. This satisfies the third requirement stated above, where the neural network should provide an approach that can allow a network to form between neural elements. The peer-to-peer connections can be formed as desired or necessary, thereby allowing for adaptive patterns to form between the iotons.

Lastly, the fourth requirement states that the neural network should be large enough to provide for a very large number of artificial neurons. RFID technologies are now being implemented into very large numbers of items that are distributed just about everywhere around the world and will be located in all manners of goods and products. The present invention implements the artificial neurons using the RFID technologies that are being implemented in such large numbers. Therefore, the sheer number of items that will include RFID technologies will allow the invention to implement an architecture for a neural network having a sufficient number of artificial neurons to replicate (and even eventually exceed) a biological neural network.

Figure 1A:
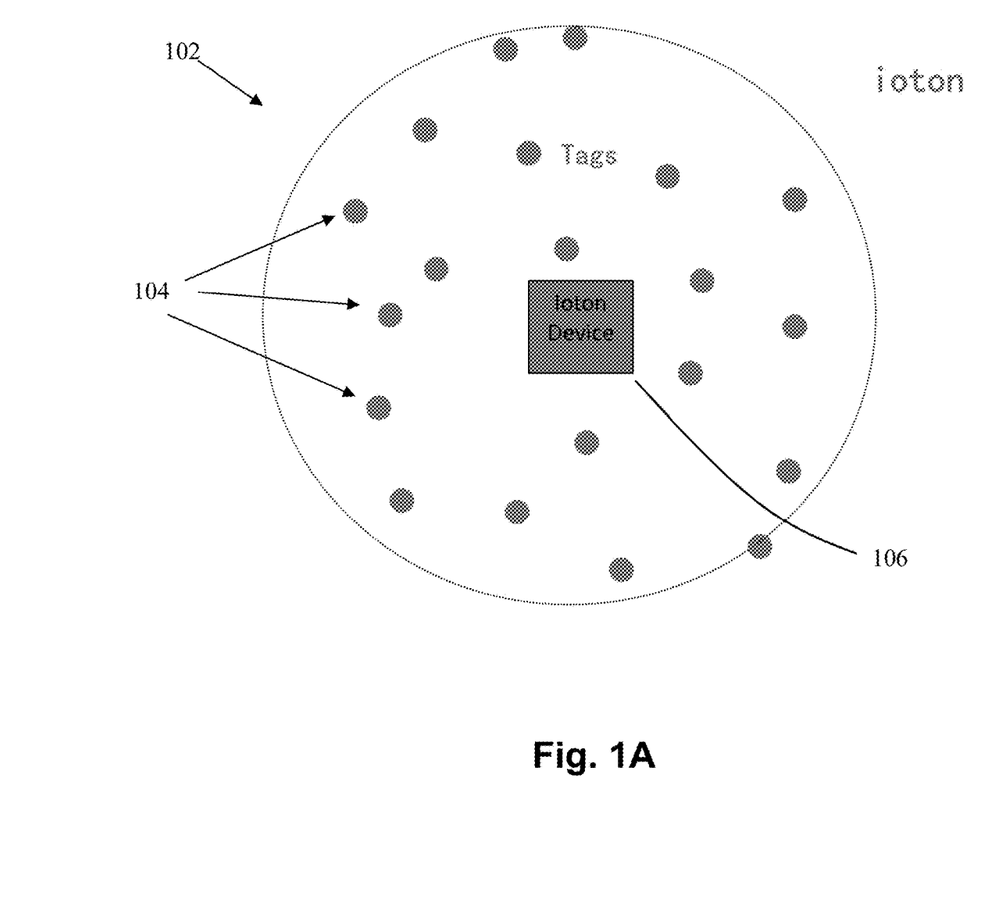
FIGS. 1A and 1B illustrate artificial iotons in accordance with some embodiments.

FIG. 1A illustrates an example ioton 102 according to some embodiments of the invention. The ioton 102 comprises a distributor process unit (DPU) 106 (may also be referred to as an ioton device) having functionality to perform reading and writing to RFID tags 104. It is the combination of the DPU 106 along with nearby RFID tags 104 that form the ioton 102 (which corresponds to a physical embodiment of a neuron).

The RFID tags 104 each may include a memory component, such as an EEPROM memory component. The RFID tags may be either powered or non-powered. In some embodiments, the RFID tag 104 comprises a passive tag having non-volatile memory. The RFID tag in some embodiments may comprise SRAM memory components.

Each DPU 106 has a certain radius in which it is able to access RFID tags 104. For example, where the DPU 106 uses a 900 MHz ISO 180000-6 protocol to access RFID tags 104, the radius of access to RFID tags 104 may correspond to about 10 meters. Therefore, the RFID tags 104 within that radius provide the memory for the ioton 102. It is noted that any suitable communications protocol or frequency may be used to communicate between the DPU 106 and the RFID tags 104, and therefore the communication is not limited to the 900 MHz frequency or the specific protocol specified above.

The DPU 106 can correspond to one or more sensor devices. In some embodiments, the sensor devices comprise MEMS sensors for speed, acceleration, temperature, moisture, sound, light/image/video capture, chemical detection, GPS location, and/or any other suitable or appropriate sensing functionality.

Figure 1B:
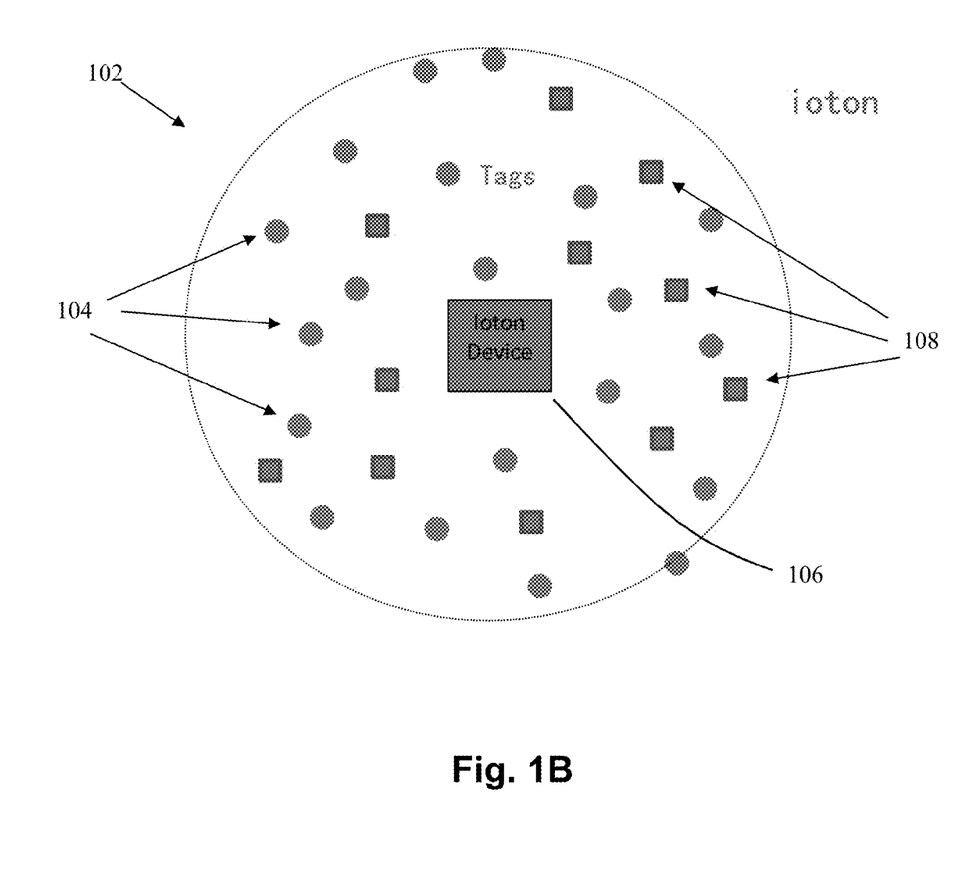

In some embodiments, DPU 106 may access different types of tags and sensors through different types of communications protocols. For example, FIG. 1B illustrates a DPU 106 configured to be able to communicate with a plurality of RFID tags 104 and a plurality of external sensor systems 108. Sensor systems 108 may comprise any type of device capable of sensing an environmental condition, such as speed, acceleration, temperature, moisture, sound, light/image/video capture, chemical detection, GPS location, electrical signals, etc. In addition, sensor systems 108 may in some embodiments comprise an input device upon which a user may enter one or more inputs. DPU 106 may communicate with RFID tags 104 and sensors systems 108 using different communications protocols. For example, in some embodiments, DPU 106 communicates with RFID tags 104 using UHF (ultra high frequency) RFID protocols, and communicates with sensor systems 108 using a ZigBee protocol (e.g., sensor systems 108 are ZigBee modules).

In some embodiments, sensor systems 108 may be located on or integrated with RFID tags 104, such that DPU 106 is able to communicate with them using RFID protocols. In some embodiments, RFID tags 104 may be passive, consuming little or no power when not communicating with DPU 106 or other RFID devices.

It is noted that any suitable communications protocol or frequency, or combination of protocols or frequencies, may be used to communicate between the DPU 106, the RFID tags 104, and the sensor systems 108, and that the communication is not limited to any specific protocol specified above (e.g., UHF RFID and ZigBee).

Figure 2A:
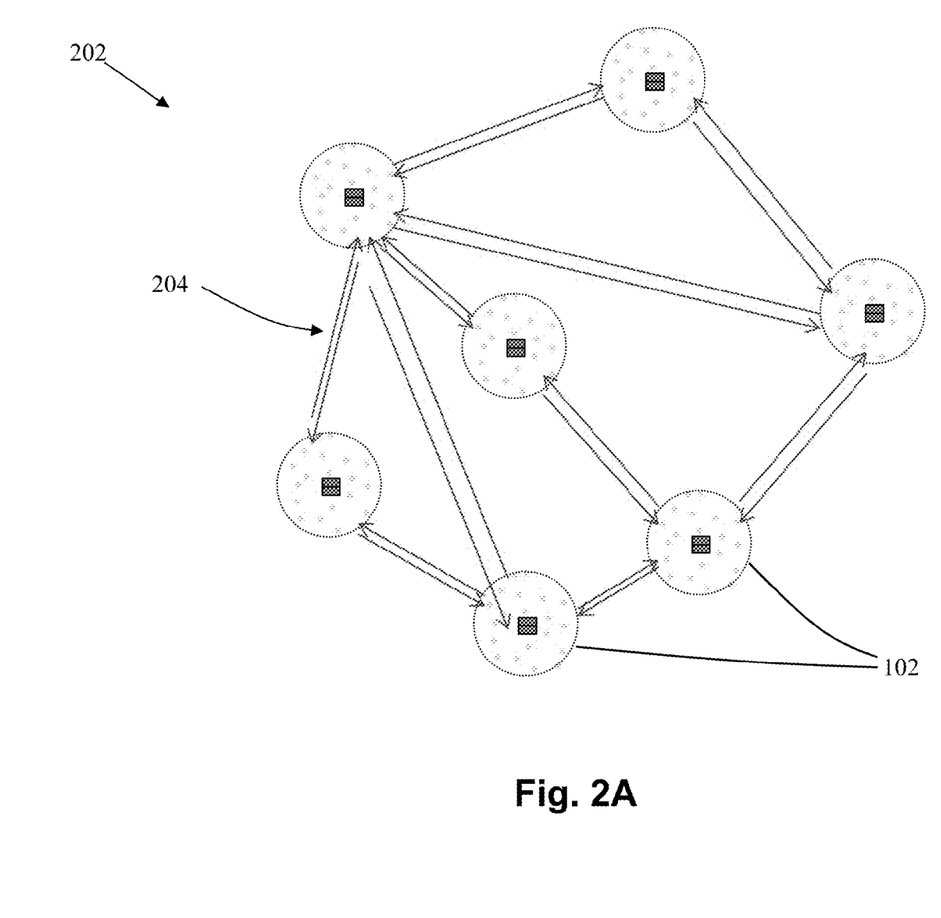
FIG. 2A illustrates an architecture of a neural network in accordance with some embodiments.

FIG. 2A illustrates an architecture of an artificial neural network 202 according to some embodiments of the invention. In this architecture, each ioton 102 can make a network pairing 204 with any neighboring ioton 102. Each ioton 102 is capable of making a pairing 204 with any other ioton 102 within its networking range.

Any suitable networking protocol or frequency can be used to make the pairing. In some embodiments, mesh networking methodologies are performed to implement the pairings. One example mesh network approach is to use the 6lowpan protocol to implement pairing between one ioton and another ioton.

In some embodiments, DPUs 106 of iotons 102 may communicate through an air interface, such as a CDMA (code division multiple access) interface. The specific interface used may be based upon standards of a location in which the artificial neural network 202 is based (e.g., TD-SCDMA in China, CDMA2000 in the United States, W-CDMA in Japan). In some embodiments, a frequency range for the air interface is chosen such that it does not interfere with cellular communications. In addition, the frequency range may be sub-divided into a plurality of frequency sub-ranges, allowing for a given DPU to be part of a plurality of different artificial neural networks corresponding to the different sub-ranges. The size of each sub-range may be configured depending upon the needs of the network, wherein a wider frequency sub-range allows for greater bandwidth and higher data throughput.

Figure 5:
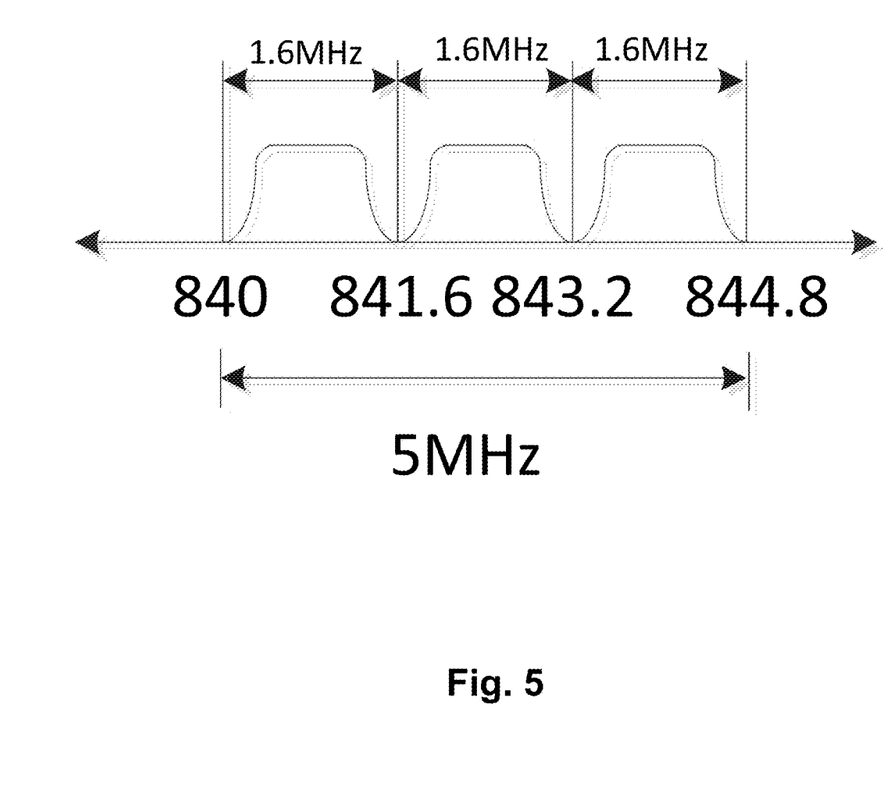
FIG. 5 illustrates a bandwidth allocation scheme for DPUS pairings in accordance with some embodiments.

For example, in China, TD-SCDMA is typically run in the frequency ranges of 2010 MHz to 2025 MHz and 1880 MHz to 1900 MHz, used for voice communication, while the frequency ranges of 920 MHz to 925 MHz and 840 MHz to 845 MHz are reserved for RFID communications. However, typical RFID communications are on the range of 920 MHz to 925 MHz, and not on the range of 840 MHz to 845 MHz. Therefore, in some embodiments, the air interface between DPUs is configured to be in the frequency range of 840 MHz to 845 MHz. In addition, this 5 MHz range may be divided into three sub-ranges of 1.6 MHz each, as illustrated in FIG. 5, wherein the frequency range of 1.6 MHz is selected to allow for sufficient data throughput for the network. Thus the DPU may be a part of up to three distinct artificial neural networks.

Figure 2B:
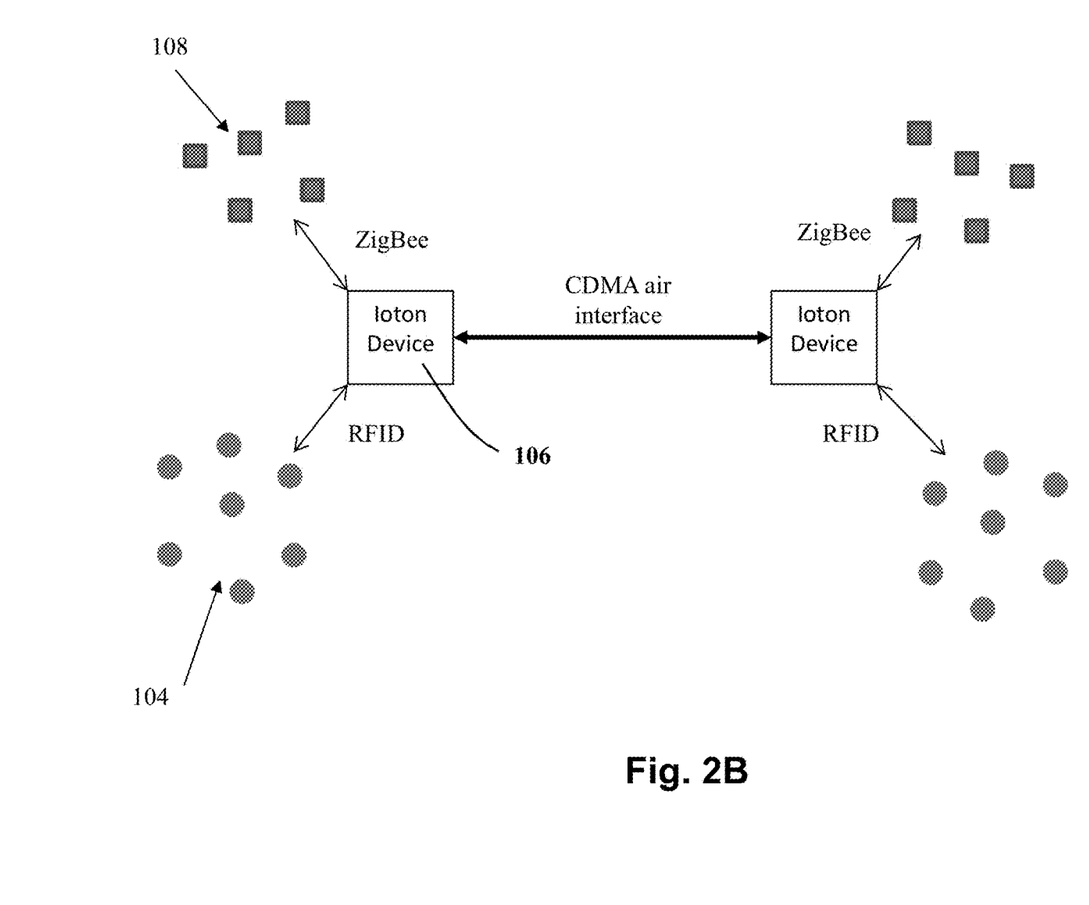
FIG. 2B illustrates a pairing between two iotons in accordance with some embodiments.

FIG. 2B illustrates a pair between two DPUs 106a and 106b of two different iotons in accordance with some embodiments. DPUs 106a and 106b are each configured to communicate with a plurality of RFID tags 104 using UHF RFID (e.g., operating in the 920 MHz to 925 MHz frequency range), and a plurality of sensor systems 106 using ZigBee protocols. In addition, DPUs 106a and 106b are able to communicate with each other through a TD-SCDMA air interface (e.g., operating in the 840 MHz to 845 MHz frequency range).

Similar to biological neurons that make connections with neighboring neurons through adaptive learning, the ioton 102 is capable of using mesh networking to make connections 204 to other iotons 102 on an adaptive basis. Rules can be implemented to manage and track pairings, where the rules are either predetermined and/or programmable.

The iotons 102 can have different types and/or sets of configurations. For example, the iotons 102 may have differing numbers of tag and/or different types/numbers of sensors. The iotons 102 may also have differing numbers of pairings to other iotons 102. While the term "pairing" is utilized to indicate a connection between two iotons, it is noted that some embodiments can provide for networking protocols in which different numbers of iotons are "paired" together.

Figure 2C:
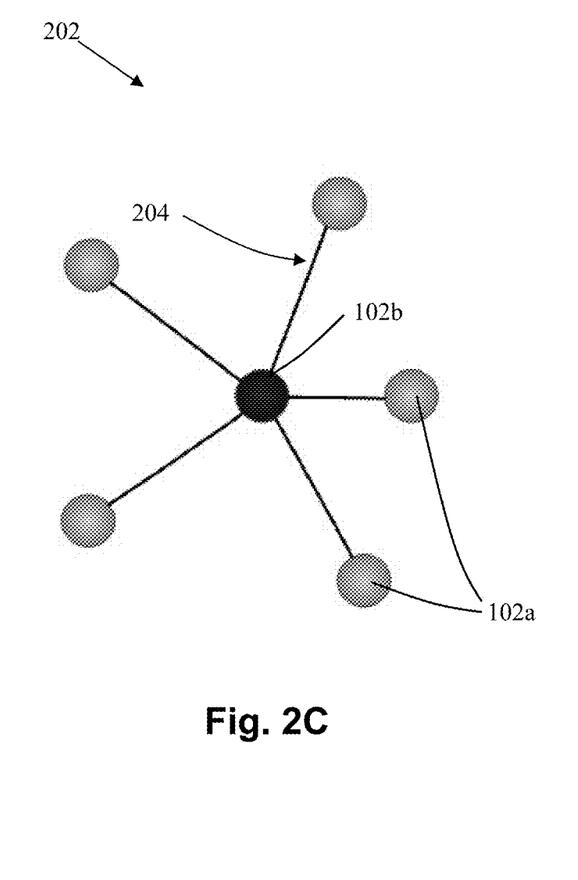
FIGS. 2C-2E show different types of architectures that may be used to implement a neural network in accordance with some embodiments.
Figure 2D:
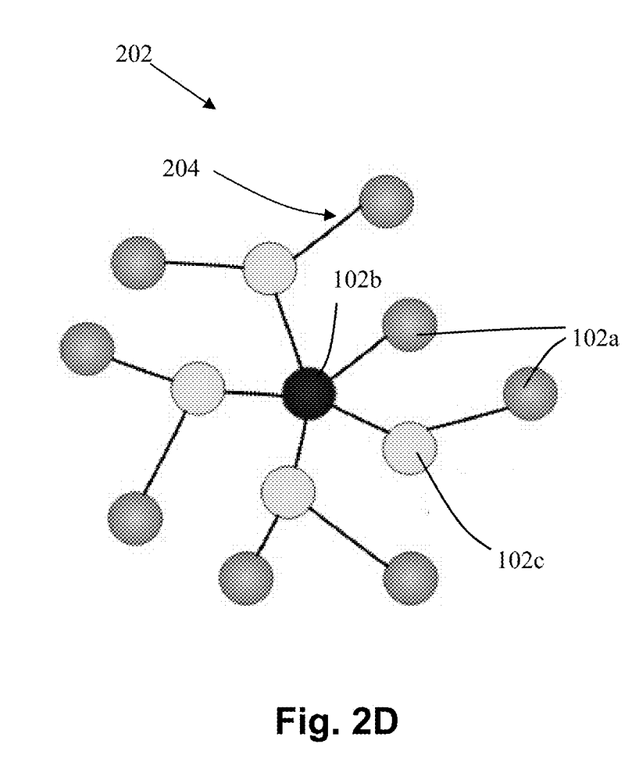

The organization of artificial neural network 202 may have a form in accordance with one or more rules. In some embodiments, iotons 102 may be arranged in a "star" configuration, as illustrated in FIG. 2C, wherein a plurality of leaf iotons 102a connect to a central ioton 102b. In this configuration, all communications between iotons in the artificial neural network 202 pass through central ioton 102b. As a result, central ioton 102b may devote a larger proportion of its processing power towards handling communications, and may have less processing power for computation and other processing. In other embodiments, iotons 102 may be arranged in a "tree" configuration, as illustrated in FIG. 2D, wherein artificial neural network is arranged into a plurality of branches connected by a central ioton 102b, wherein each branch contains a plurality of branch iotons 102c and leaf iotons 102a. It is noted that although the illustrated embodiment shows only one level of branch iotons 102c, an artificial neural network 202 in a "tree" configuration may contain many levels of branch iotons 102c in each branch.

Figure 2E:
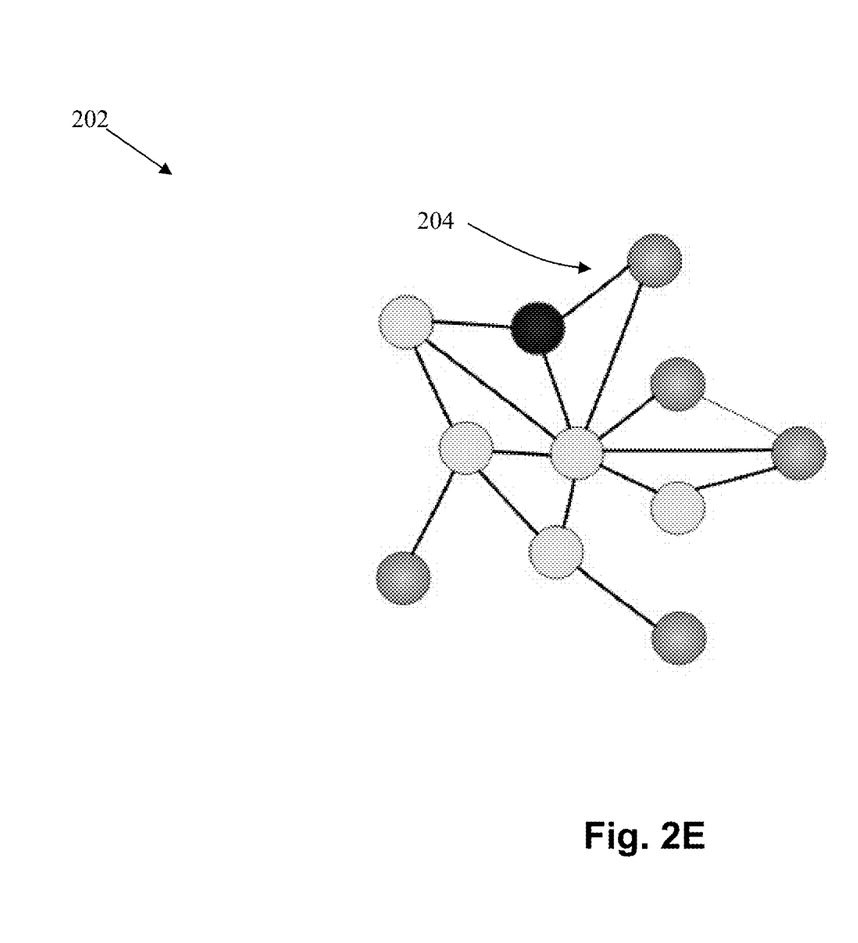

In some embodiments, artificial neural network 202 may have a flat or web structure, as illustrated in FIG. 2E. In this configuration, each ioton 102 may connect to any number of other iotons 102 in the network, subject to processing power and communication range. In some embodiments, iotons on the network may communicate with other iotons on the network directly, or through one or more intermediate iotons.

In some embodiments, iotons 102 in artificial neural network 202 may be substantially identical in structure. However, individual iotons 102 within the network may exhibit different processing characteristics based upon position within the network, a function of the ioton within the network, number of pairings to an ioton, or any combination thereof. For example, a first ioton on the edge of the network may have more processing power to devote to computation in comparison to a second ioton in the middle of the network that functions as a relay or intermediary between multiple other iotons, while the second ioton may have more processing power used for communication. In some embodiments, individual iotons 102 in the network may adapt and adjust their respective processing parameters during operation in response to ioton workload (e.g., an ioton may begin devote more processing power towards communications in response to receiving a certain number of communication tasks).

While FIGS. 2A-E show only a small number of iotons connected together, it is noted that the invention pertains to such networks in which a vast number of iotons may be networked together. In fact, the eventual population of devices that correspond to the internet-of-things will eventually number in the trillions (or more). Any of those devices can potentially be tied into the current architecture, allowing for an artificial neural network having a tremendously large number of iotons, and hence correspondingly expansive performance capacities.

Figure 3:
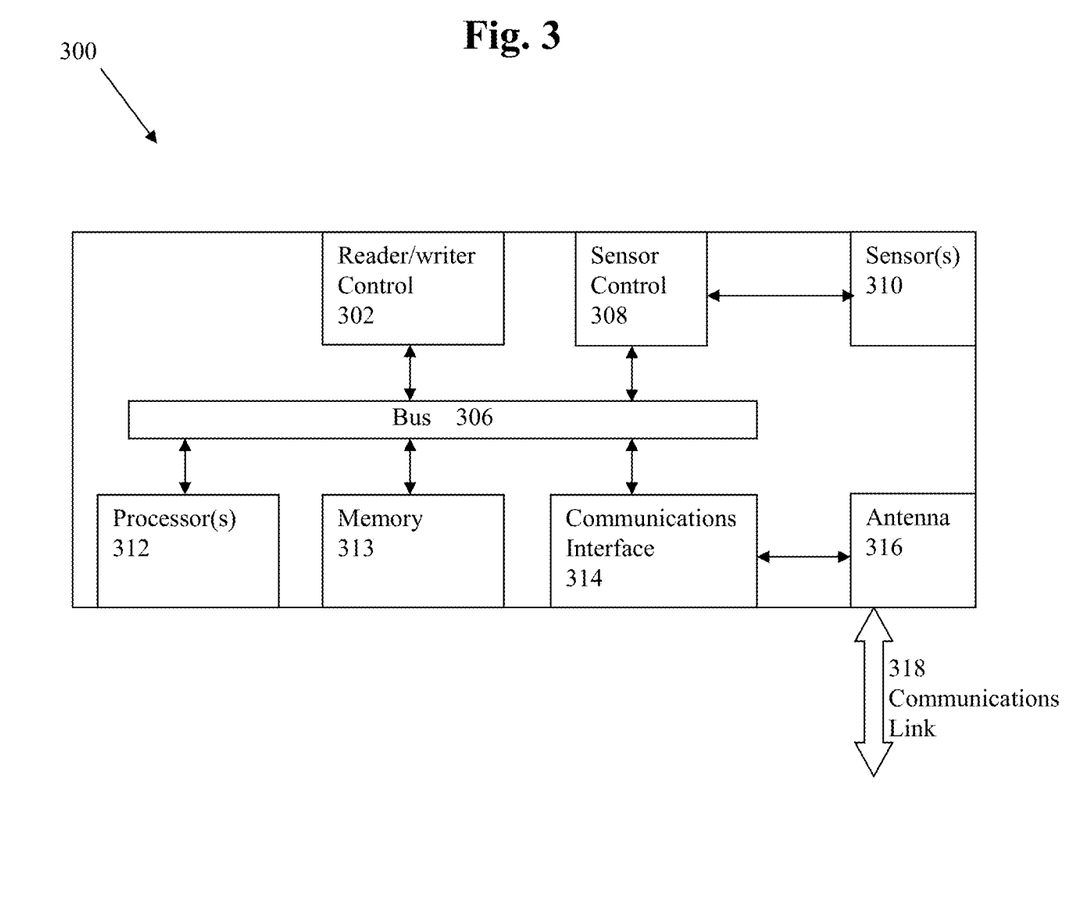
FIG. 3 illustrates an architecture of a DPU in accordance with some embodiments.

FIG. 3 illustrates a block diagram of an example architecture 300 for an DPU. The architecture 300 includes a bus 306 or other communication mechanism for communicating information, which interconnects subsystems and devices, such as processor 312, system memory 313 (e.g., SRAM), communication interface 314, reader/writer control subsystem 302, and sensor controller 308.

The sensor controller 308 controls and communicates with one or more sensors 310. In some embodiments, the sensors 310 correspond to one or more MEMS sensors for speed, acceleration, temperature, moisture, sound, light/image/video capture, chemical detection, GPS location, and/or any other suitable or appropriate sensing functionality.

The communications interface 314 interfaces with an antenna 316 to perform communications functionality. This allows the ioton form network pairings with other iotons through a communications link 318 (e.g., wireless mesh networking link), to transmit and receive messages, data, and/or instructions with the other iotons. In addition, communications can be exchanged with RFID tags that form the memory component for the iotons.

In some embodiments, the components illustrated in architecture 300 are integrated into a single IC chip. In alternate embodiments, the architecture may be implemented as separate components, e.g., using an external sensory input device that connects to the ioton IC device.

The DPU 300 performs specific operations by having the processor 312 execute one or more sequences of one or more instructions contained in system memory 313. Hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that is usable or readable by any computing device, such as the DPU. Such a medium may take many forms, including but not limited to, non-volatile media and volatile media. Non-volatile media includes, for example, optical or magnetic disks, such as disk drive 1410. Volatile media includes dynamic memory, such as system memory 313. Common forms of computer readable media includes, for example, RAM, PROM, EPROM, FLASH-EPROM, any other memory chip or cartridge, or any other medium from which a computer can read.

Figure 4:
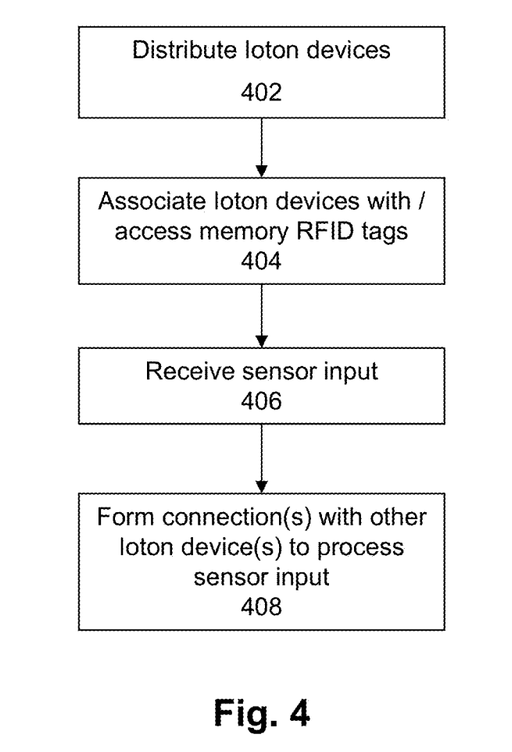
FIG. 4 illustrates a flowchart of a process for implementing a neural network in accordance with some embodiments.

FIG. 4 shows a flowchart of an approach to implement some embodiments of the invention. At 402, DPUs are distributed. For example, this type of distribution may be made in the context of objects that are part of the internet of things. In particular, RFID technologies are now being distributed in many types of items and objects, e.g., within consumer items purchased from ordinary shops and businesses. Thus in some embodiments, DPU distribution comprises establishing a plurality of DPUs in a plurality of different locations where RFID tags and/or other types of sensor or memory devices (e.g., ZigBee modules) are located.

At 404, DPUs are associated with RFID tags. As noted above, the reader functionality within the ioton is capable of accessing the RFID tags within its networking range. The RFID tags are accessed to form the memory components for the ioton. In some embodiments, the DPUs may, in addition to accessing RFID tags, also access one or more ZigBee modules or other types of wireless-enabled modules. The DPU and its associated tags/modules/devices together form an ioton.

At 406, sensory inputs are received by the ioton. The sensory inputs correspond to inputs from any of the sensor devices associated with the ioton. Examples of such inputs include sensory inputs for speed, acceleration, temperature, moisture, sound, light/image/video capture, chemical detection, and/or GPS location. The sensory inputs may be received from a sensor on the DPU, or may be received from sensors located on an RFID tag, ZigBee module, or other associated device that is wirelessly accessible by the DPU.

At 408, connections are formed with other iotons to process the sensory inputs. If the connections are already in existence (previously formed), then this step can be skipped and the existing connection re-used.

The connections between the iotons are formed to implement artificial neural processing. The processing can be used to implement any desired functionality. For example, computational activity can be implemented, where the neural network is an adaptive system that changes its structure based on external or internal information that flows through the network. The computations can be performed, for example, to implement decision-making tools, pattern-matching algorithms, learning systems, and control systems. Some example tasks for the neural network can include function approximations, regression analysis, predictions and modelings, classifications, pattern and sequence recognition, decision making, data processing, data filtering, and compression. Some example applications for the neural network can include system identification and control, game-playing and decision making, pattern recognition, sequence recognition, medical diagnosis, financial applications, data mining, visualization, and filtering.

Therefore, what has been described is an improved approach to implement artificial neural networks. The present disclosure provides an advanced neural network that is implemented using an internet-of-things methodology, in which a large number of ordinary items are utilized as the vast infrastructure of a neural network. The ordinary items are equipped within RFID tags to allow them to participate as part of the neural network. Artificial iotons are constructed using an DPU that becomes associated with RFID tags. These artificial iotons forms connections with other iotons, where over time, a huge network of connections are formed.

The present approach provides a solution to the problems that plague conventional attempts to implement neural networks, since the present invention is capable of implementing neural networks that can achieve desired performance capabilities and implement necessary levels of processing sophistication, complexity, and number of artificial neurons.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. An architecture for implementing a neural network, comprising:

a plurality of artificial neurons, the plurality of artificial neurons forming an arrangement of multiple devices that are networked together, wherein the plurality of the artificial neurons are networked together in a peer-to-peer network;

the plurality of artificial neurons include a control device, one or more sensor systems, and a plurality of memory devices;

the control device comprises a reader mechanism;

the one or more sensor systems perform sensing for at least one of speed, acceleration, temperature, moisture, sound, light capture, image capture, video capture, chemical detection, or GPS location;

the plurality of memory devices comprise a tag device having a memory component, wherein the tag device corresponds to a non-powered RFID tag that is a passive tag having a SRAM non-volatile memory;

the one or more sensor systems and the plurality of memory devices are within wireless communications range and wirelessly communicate with the control device, the arrangement of multiple devices that are networked together comprising billions of the artificial neurons forming trillions of connections; and the plurality of artificial neurons are networked together into a neural network that includes a plurality of network pairings having a first artificial neuron that pairs with a second artificial neuron, wherein the plurality of artificial neurons are adaptively networked together in accordance with a plurality of rules comprising at least three rules, a first rule of the at least three rules establishing a star configuration having a plurality of leaf iotons connected to a central ioton, a second rule of the at least three rules establishing a tree configuration having a plurality of branches connected to a central ioton where a branch of the plurality of branches comprises a branch ioton and a leaf ioton, and a third rule of the at least three rules establishing a flat or web structure with each ioton connecting to any number of other iotons in the neural network directly or through one or more intermediate iotons, wherein the plurality of rules are applicable to form an arrangement of iotons such that a first set of iotons corresponding to the first rule forms the star configuration, a second set of iotons corresponding to the second rule forms the tree configuration, and a third set of iotons corresponding to the third rule forms the flat or web structures;

wherein individual iotons in the neural network exhibit different processing characteristics based upon positional location within the neural network, where a first ioton on an edge position of the neural network devotes a greater amount of processing power to computation in comparison to a second ioton in a central position of the neural network that functions as a relay or intermediary between multiple other iotons, where the second ioton devotes more processing power for communication as compared to the first ioton at the edge position of the neural network;

wherein the first artificial neuron communicates through an air interface in which a frequency range for the air interface is sub-divided into a plurality of frequency sub-ranges, such that the first artificial neuron is a part of a plurality of different neural networks that correspond to different ones of the plurality of frequency sub-ranges.

2. The architecture of claim 1, in which the peer-to-peer network comprises a mesh network.

3. The architecture of claim 1, in which the frequency range for the air interface corresponds to a 5 MHz range, and the 5 MHz range is sub-divided into the plurality of frequency sub-ranges that are 1.6 MHz sub-ranges.

4. The architecture of claim 1, in which the peer-to-peer network comprises an ad hoc pairing between two artificial neurons.

5. The architecture of claim 4, in which each artificial neuron is capable of pairing with another artificial neuron within communications range.

6. The architecture of claim 5, in which the pairing is implemented wirelessly using a wireless communications protocol.

7. The architecture of claim 6, in which the wireless communications protocol operates using a 900 MHz band using a 6lowpan protocol.

8. The architecture of claim 5, in which the pairing is implemented using a CDMA air interface.

9. The architecture of claim 8, in which the CDMA air interface is a TD-SCDMA interface with an operating frequency between 840 MHz and 845 MHz.

10. The architecture of claim 4, in which two artificial neurons can have different numbers of network pairings.

11. The architecture of claim 1, in which two artificial neurons can have different numbers or types of sensors.

12. The architecture of claim 1, in which the one or more sensor systems comprise a MEMS sensor.

13. The architecture of claim 1, in which the control device for the artificial neuron comprises a communications infrastructure that interfaces with the tag device using a wireless communications protocol.

14. The architecture of claim 13, in which the wireless communications protocol is implemented at a 900 MHz frequency.

15. The architecture of claim 13, in which the wireless communications protocol is implemented using an RFID protocol.

16. The architecture of claim 13, in which the control device for the first artificial neuron further comprises a communications infrastructure that interfaces with the one or more sensor systems using a wireless communications protocol.

17. The architecture of claim 16, in which the control device interfaces with the one or more sensor systems using a ZigBee protocol.

18. The architecture of claim 16, in which the one or more sensor systems are part of or integral with the tag device, such that the control device is able to interface with the one or more sensor systems using an RFID protocol.

19. The architecture of claim 13, in which the control device and a memory device are integrated into a single device with both controlling and memory functions.

20. The architecture of claim 19, in which the single device having both the control device and the memory device is implemented as a single IC chip having the reader mechanism and the one or more sensor systems.

21. The architecture of claim 1, in which the reader mechanism and the one or more sensor systems are implemented as separate components in the control device.

22. The architecture of claim 1, in which the control device and the tag devices are distributed as objects in an internet-of-things architecture.

23. The architecture of claim 1, in which the control device and the tag devices are distributed in consumer items.

24. The architecture of claim 1, in which the neural network implements decision-making tools, pattern-matching algorithms, learning systems, or control systems.

25. A method for implementing a neural network, comprising:
distributing a plurality of artificial neurons as distributed devices, wherein the plurality of artificial neurons comprise short range communications technology,
implementing the plurality of artificial neurons to include a control device, one or more sensor systems, and a plurality of memory devices;
providing the control device to include a reader mechanism;
providing the one or more sensor systems to perform sensing for at least one of speed, acceleration, temperature, moisture, sound, light capture, image capture, video capture, chemical detection, or GPS location;
providing the plurality of memory devices to comprise a tag device having a memory component, wherein the tag device corresponds to a non-powered RFID tag that is a passive tag having a SRAM non-volatile memory;
networking the plurality of artificial neurons together into an arrangement comprising billions of the artificial neurons forming trillions of connections, wherein the plurality of artificial neurons are networked together as part of an adaptable peer-to-peer network;
adaptively networking the plurality of artificial neurons together in accordance with a plurality of rules comprising at least three rules, a first rule of the at least three rules establishing a star configuration having a plurality of leaf iotons connected to a central ioton, a second rule of the at least three rules establishing a tree configuration having a plurality of branches connected to a central ioton where a branch of the plurality of branches comprises a branch ioton and a leaf ioton, and a third rule of the at least three rules establishing a flat or web structure with each ioton connecting to any number of other iotons in the neural network directly or through one or more intermediate iotons, wherein the plurality of rules are applicable to form an arrangement of iotons such that a first set of iotons corresponding to the first rule forms the star configuration, a second set of iotons corresponding to the second rule forms the tree configuration, and a third set of iotons corresponding to the third rule forms the flat or web structure;

implementing different processing characteristics for individual iotons in the neural network based upon positional location within the neural network, where a first ioton on an edge position of the neural network devotes a greater amount of processing power to computation in comparison to a second ioton in a central position of the neural network that functions as a relay or intermediary between multiple other iotons, where the second ioton devotes more processing power for communication as compared to the first ioton at the edge position of the neural network; and configuring an artificial neuron to communicate through an air interface in which a frequency range for the air interface is sub-divided into a plurality of frequency sub-ranges, such that the artificial neuron is a part of a plurality of different neural networks that correspond to different ones of the plurality of frequency sub-ranges.

26. The architecture of claim 1, where the first artificial neuron is part of a first neural network corresponding to a first frequency sub-range and is part of a second neural network corresponding to a second frequency sub-range.

27. The method of claim 25, in which the control device comprises an RFID reader mechanism, and the plurality of memory devices comprise a RFID tag having memory component that is within communications range of the control device.

28. The method of claim 27, in which the control device discovers the RFID tag within the communications range and uses the RFID tag as its associated memory device.

29. The method of claim 25, in which the plurality of artificial neurons form the peer-to-peer network to implement processing functions.

30. The method of claim 29, in which the peer-to-peer network comprises a mesh network.

31. The method of claim 25, in which two artificial neurons can have different numbers of network pairings.

32. The method of claim 25, in which the plurality of artificial neurons form pairings based upon input received through a sensor.

33. The method of claim 32, in which the plurality of artificial neurons can have different numbers or types of sensors.

34. The method of claim 33, in which at least one sensor comprises a MEMS sensor.

35. The method of claim 25, in which the plurality of artificial neurons are distributed as objects in an internet-of-things architecture.

36. The method of claim 25, in which the control device and RFID tags of the plurality of artificial neurons are distributed in consumer items.

37. The method of claim 25, in which the neural network implements decision-making tools, pattern-matching algorithms, learning systems, or control systems.

38. The method of claim 25, where the artificial neuron is part of a first neural network corresponding to a first frequency sub-range and is part of a second neural network corresponding to a second frequency sub-range.

* * * * *